United States Patent Office 2,839,583
Patented June 17, 1958

2,839,583

PROCESS FOR THE PREPARATION OF DI-(P-ANISYL)-IODONIUM HALIDE

John Thomas Plati, Rutherford, N. J., assignor to Hoffmann-La Roche Inc., Nutley, N. J., a corporation of New Jersey No Drawing. Application February 28, 1957
Serial No. 642,969

4 Claims. (Cl. 260—613)

This invention relates to a process for the preparation of di-(p-anisyl)-iodonium halide which is useful as a starting material for the synthesis of 3,5-diiodothyronine.

Prior methods of synthesizing di-(p-anisyl)-iodonium halide involve roundabout and time-consuming procedures. In some of the known methods of synthesis, great caution must be exercised because of the instability and tendency of certain of the reactants to explode. In other methods, it is necessary to dilute with water and to extract exhaustively with ether before isolation of the final product. Needless to say, the yields of di-(p-anisyl)-iodonium halide are extremely low.

It has now been found that di-(p-anisyl)-iodonium halide may be synthesized by an improved process providing greater yields. This process comprises reacting iodine with iodine pentoxide in concentrated sulfuric acid to form an iodous reagent, effectively removing the sulfuric acid from the precipitated iodous reagent, condensing the iodous reagent with anisole and directly precipitating di-(p-anisyl)-iodonium halide from the reaction mixture with a halide precipitating agent.

One essential feature of this invention involves the use of a particular iodous reagent which is prepared by the reaction of iodine pentoxide and elemental iodine in the presence of concentrated sulfuric acid at about room temperature. An excess of iodine pentoxide is preferably used. As a second important feature, it is essential, after the iodous reagent has been prepared, that excess sulfuric acid be removed from the liquor. This avoids too vigorous a reaction and widespread decomposition in the next step. The excess sulfuric acid is removed by extracting the mother liquor with acetic acid. The precipitate, which is the iodous reagent, is separated by decanting off the mother liquor or by filtration.

The iodous reagent prepared in this manner is then suspended in a diluent, preferably acetic acid, and reacted with anisole at a temperature of about 15° to 35° C., preferably about room temperature.

After completion of the reaction, a halide precipitating agent is added directly to the reaction mixture, whereupon the di-(p-anisyl)-iodonium halide precipitates in crystalline form. Ammonium halides, alkali metal halides and alkaline earth metal halides may be used as precipitating agents. Ammonium bromide, ammonium iodide, sodium bromide, sodium iodide, potassium bromide, and potassium iodide are preferred.

By carefully observing the conditions set out above, the synthesis becomes relatively simple and improved yields are obtained. The precipitating agent may be added directly to the final reaction medium and the product is obtained in good crystalline form. This is in contrast to prior procedures requiring dilution of the reaction mixture with large amounts of water and extraction with organic solvents which often only yield a product of poor crystalline shape. Decomposition of the reagents and the product is also avoided.

Approximately one and one half mols of iodine pentoxide per mol of iodine are required, but an excess of the former, e. g. up to about two and one half mols of iodine pentoxide per mol of iodine is preferred. The proportion of concentrated sulfuric acid is not critical. Sufficient acid is used in order to provide a suitable liquid reaction medium. It is essential, however, that all of the excess sulfuric acid be removed from the iodous reagent prior to the reaction with anisole. A volume of acetic acid in excess of the volume of sulfuric acid must be used. In the reaction of anisole with the iodous reagent, at least 10 mols of anisole is required per mol of elemental iodine used in preparing the iodous reagent. A slight excess of anisole, e. g. 5 to 10%, is desirable. Acetic acid is the preferred diluent for the reaction with anisole. In each instance when acetic acid is used, a small amount of water may be present in the acetic acid, but glacial acetic acid is preferred in order to avoid decomposition of the iodous reagent. About one and one half times the calculated amount of precipitating agent in twice the volume of water is used.

The following example is illustrative of the invention. All temperatures are in degrees centigrade.

*Example*

A mixture of 250 cc. of concentrated sulfuric acid, 20.4 grams (0.08 mol) of powdered iodine and 60.0 grams (0.18 mol) of iodine pentoxide were stirred at room temperature for 24 hours. During this period, the iodine gradually disappeared and a yellow precipitate formed. The mixture was then cooled in an ice bath and 1000 cc. of glacial acetic acid was added at such a rate that the temperature did not exceed 20°. About 30 minutes were required. After the acetic acid had been added, the cooling bath was removed and stirring was continued for about 15 minutes. The heavy yellow precipitate was then allowed to settle without agitation for about one hour and the supernatant liquor was removed by decantation.

Stirring was resumed and then 1000 cc. of fresh glacial acetic acid was added to the yellow precipitate obtained above. The mixture was cooled intermittently with an ice bath while 90 cc. (0.83 mol) of anisole was added at such a rate that the temperature was maintained at 15-16°. This addition required about one hour and forty-five minutes. The mixture, which became dark in color, was then stirred for an additional two hours at the same temperature. The solution was filtered to remove a small amount of a gray-white precipitate. To the filtrate was added with stirring a solution of 60 grams (0.58 mol) of sodium bromide in 120 cc. of water. Stirring was continued at 16-18° for one hour during which di-(p-anisyl)-iodonium bromide separated in crystalline form. The crystals were filtered, washed first with acetic acid and finally digested with 200 cc. of water. The crystals were dried in vacuo over potassium hydroxide. This first crop of di-(p-anisyl)-iodonium bromide amounted to 73 grams and melted at 190-192°. An additional 7.2 grams were obtained by concentration of the mother liquor in vacuo to obtain a total yield of 80.2 grams (47.6%). The material thus obtained is suitable for subsequent reactions.

The compound may be purified by recrystallization from about 15 volumes of ethylene glycol monomethyl ether (methyl Cellosolve) to yield a well crystallized material of M. P. 195-197°.

I claim:

1. A process which comprises reacting iodine with an excess of iodine pentoxide in concentrated sulfuric acid, thoroughly extracting the sulfuric acid from the precipitated reaction product, condensing the reaction product with an excess of anisole and directly precipitating di-(p-anisyl)-iodonium halide from the reaction mixture with an excess of halide precipitating agent.

2. A process which comprises reacting iodine with an excess of iodine pentoxide in concentrated sulfuric acid, thoroughly extracting the sulfuric acid from the precipitated reaction product with glacial acetic acid, condensing the reaction product with at least 10 molecular proportions of anisole in an inert diluent and precipitating di-(p-anisyl)-iodonium halide by treating the reaction mixture with an excess of a member of the group consisting of ammonium halide, alkali metal halide and alkaline earth metal halide.

3. A process as in claim 2 wherein the precipitating agent is sodium bromide.

4. A process which comprises forming an iodous reagent by reacting iodine and iodine pentoxide in a proportion of about one mol of iodine per one and one half to two and one half mols of iodine pentoxide in concentrated sulfuric acid, thoroughly extracting the sulfuric acid from the reaction liquor with an excess of glacial acetic acid, suspending the separated iodous reagent in fresh glacial acetic acid, reacting said iodous reagent with at least ten molecular proportions of anisole and precipitating crystalline di-(p-anisyl)-iodonium bromide with an excess of aqueous sodium bromide.

References Cited in the file of this patent

Mastrapaolo: Chem. Abstracts, vol. 35 (1941), col. 734–35 (2 pp.)